United States Patent [19]
Marion

[11] 3,941,551
[45] Mar. 2, 1976

[54] APPARATUS INVOLVING A CENTERPLATE AND A HEAT SINK BETWEEN MULTIPLE FLAT EXTRUSION STREAMS

[76] Inventor: George J. Marion, 691 E. Boot Road, West Chester, Pa. 19380

[22] Filed: Jan. 22, 1974

[21] Appl. No.: 435,490

Related U.S. Application Data

[63] Continuation-in-part of Ser. No. 223,436, Feb. 4, 1972, Pat. No. 3,797,987, which is a continuation-in-part of Ser. No. 861,047, Sept. 25, 1969, abandoned.

[52] U.S. Cl.............. 425/463; 425/379 R; 425/466
[51] Int. Cl.²......................... B29D 7/02; B29F 3/08
[58] Field of Search............ 425/131, 378 R, 378 S, 425/381, 463, 466, 379 R, 379 S, 462; 156/244, 500

[56] References Cited
UNITED STATES PATENTS

| | | | |
|---|---|---|---|
| 2,718,661 | 9/1955 | Russell | 425/466 |
| 3,382,537 | 5/1968 | Tigher | 425/463 |
| 3,462,332 | 8/1969 | Goto | 156/500 X |
| 3,516,886 | 6/1970 | Quackenbush et al. | 156/244 |
| 3,640,659 | 2/1972 | Dimitrov | 156/500 |
| 3,829,274 | 8/1974 | Melead | 425/466 |

Primary Examiner—Ronald J. Shore
Assistant Examiner—Mark Rosenbaum
Attorney, Agent, or Firm—Jackson, Jackson & Chovanes

[57] ABSTRACT

A dual outlet extrusion flat film die assembly for various thermo-extrudable materials includes split manifold chambers separated from each other by a rigid centerplate. Each portion of the die in the direction behind the flow materials includes a heat sink slot behind the manifold. Each manifold tapers toward its own die mouth; has separate melt inlets adapted for center, top or end feed operations; has separate pre-land and final land surfaces leading to individual outlet openings for precise control of melt flow; and has separate heat control means allowing precise temperature control for each melt as it flows throughout the die. Temperature differentials ranging from 0° to 200°F. are obtainable between the extruded layers. A differential push-pull adjustment system for each movable lip of each outlet opening includes opposed alternatingly staggered thimble bolts to precise control of each individual layer profile.

2 Claims, 6 Drawing Figures

APPARATUS INVOLVING A CENTERPLATE AND A HEAT SINK BETWEEN MULTIPLE FLAT EXTRUSION STREAMS

CROSS-REFERENCE TO RELATED APPLICATIONS

This application is a continuation-in-part application of my co-pending application U.S. Ser. No. 223,436, filed Feb. 4, 1972, now U.S. Pat. No. 3,797,987, which is incorporated by reference, which is in turn a continuation-in-part application of my U.S. Ser. No. 861,047, now abandoned filed Sept. 25, 1969, which is incorporated by reference, the whole being a continuous series of co-pending applications.

BACKGROUND OF THE INVENTION

1. Field of the Invention

The invention relates to extrusion apparatus for producing films or sheets and more particularly to extrusion apparatus capable of coextruding two or more flat layers of materials laminatable to each other and/or other substrates.

2. Prior Art

Apparatus for the coextrusion of flat multi-layer films of at least certain thermo-extrudable material is known. Certain of such apparatus includes separate manifolds feeding individual melts to a common passageway so that contiguous boundaries between adjoining melts are formed and the resulting melt stream exists from the apparatus as a composite film. However, in such systems complex adjustments are necessary to achieve individual melt thickness control and only materials having similar resin rheology are usable. Furthermore, individual temperature control for each melt in such systems is not readily attained, especially during flow over the common passageway. Other known apparatuses utilize a single manifold for receiving a plurality of melts and a special adapter within the manifold lines up the melt stream in a desired sequence. In such systems, the resins utilized must have about equal apparent melt viscosities in order to attain uniformity in thickness ratios and individual melt temperature control is not readily attainable because of the contiguous flow streams of the various melts. Yet other apparatuses which are previously known produce composite blown film wherein different melts are combined inside or outside a die. Blown films require additional processing, that is, collapsing of the bubble, slitting, folding, etc. and are thus considered relatively undesirable for the production of sheet products. Further, composite blown films do not exhibit sufficient bonding between the individual layers. Blown film dies wherein the different melts combined inside the die do not allow individual melt temperature and/or thickness control. Known blown film dies wherein the different melts combine outside of the die are incapable of adjusting the individual layer thicknesses or of regulating the temperature of each melt. All of the various known coextrusion flat film apparatuses allow edge buildup on the extruded layers, which is highly undesirable and comprises waste.

It is an object of the invention to provide an improved coextrusion apparatus for flat film which includes precise temperature control for each melt, and precise control for each extruded layer, with permissibly the avoidance of edge buildup.

SUMMARY OF THE INVENTION

The invention provides an economical and easily operable coextrusion flat film apparatus for a wide range of thermo-extrudable materials, such as resins, waxes, etc. The apparatus includes a die body having at least a pair of streamlined manifold chambers, each of which has a separate inlet. Each manifold is tapered into a separate pre-land surface and final land surface for directing a melt toward a separate outlet opening or slot. A rigid plate is positioned between each manifold and associated pre-land and final land surfaces to maintain separate melt passages throughout the die body. The rigid centerplate is composed of a heat resistant material including a heat sink so that heat is not transferred from one manifold area to the other, across the plate. A plurality of individual heat control means is provided along each side of the die body in association with each manifold, pre-land and final land surfaces so that individual temperature control of each melt is achieved throughout the individual melt flow passages in the die body for improved bonding characteristics. In certain embodiments, opposite sides of the centerplate are provided with individually controllable heating means to insure that the melt within each flow passage experiences uniform temperatures on all sides thereof. Internal and/or external deckle means are utilized with the individual final land surfaces to avoid edge buildup of the extruded layers. The deckle means selectively block the outlet slots by a predetermined amount for the material being extruded, generally depending upon the amount of neck-in occurring in an extruded layer of that material before solidification or support thereof. The outer portion of each final land surface is flexible and opposing alternatingly staggered thimble adjustment bolts are provided on each side of the die body in the vicinity of each of the outlet slots for precise profile control of each extruded layer, thereby minimizing hills and valleys within the individual layers.

The differential heating of the extruded layers allows, for example, the layer contacting a substrate to be heated to a somewhat higher temperature than the outer layer whereby better bonding between the substrates and layers occurs at a lower overall heat level and at less deterioration to the composite film.

BRIEF DESCRIPTION OF THE DRAWINGS

An understanding of further particulars of the invention may be obtained from a consideration of the following detailed description of representative embodiments thereof, taken in conjunction with the accompanying figures in the drawings, of which.

DESCRIPTION OF THE PREFERRED EMBODIMENT

Figure 1:
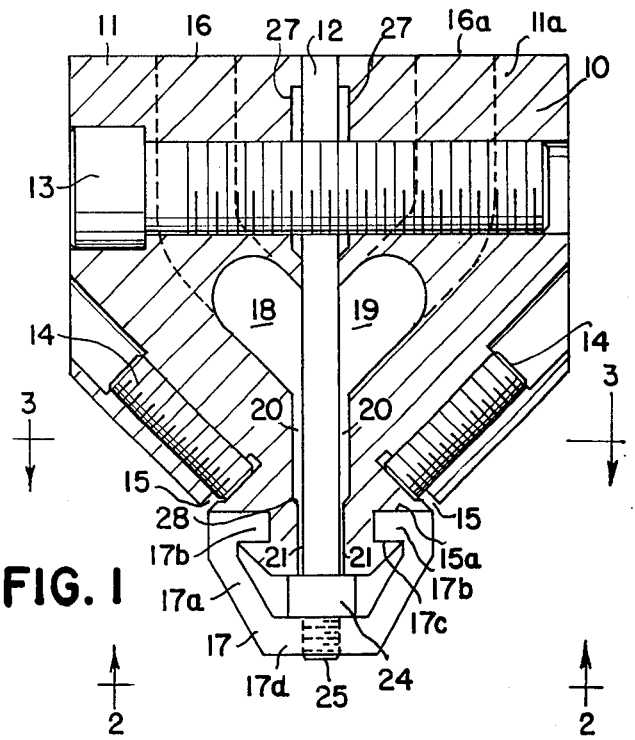
FIG. 1 is an elevational diagrammatic view of the embodiment of the invention in end elevation, with the end plate removed.

The invention comprises a coextrusion apparatus for flat film wherein precise temperatures and thickness control for each layer are achieved and edge buildup may be substantially eliminated.

Coextrusion is defined herein as a single extrusion that combines two or more thermo-extrudable materials, which may be the same or different, such as thermoplastic resins, waxes, hot melt adhesives, etc. in a molten state into a composite film that is ready to use as such or is bonded to another substrate. The invention includes a die body having a plurality of manifold chambers separated from one another by a rigid centerplate extending between the chambers. Each chamber is streamline tapered toward its own outlet opening and is provided with separate pre-land and final land surfaces, extending sequentially toward separate outlet openings or slots for improved melt flow control. A plurality of separate manifold chambers, pre-land and final land surfaces as well as separate outlet slots provides improved throttling of each melt, improved layer thickness control and overall layer ratio control by separate, precise adjustments of each of the lip portions adjacent each outlet slot. Opposed alternatingly staggered thimble bolts are associated with each of the outlet slots for precise profile control of each extruded layer. Heat control means are associated with each melt flow passage within the die so that the temperature of each melt is fully and independently regulated throughout its flow within the die body.

Deckle means, external, internal or a combination thereof, are associated with each of the outlet slots in an offset manner from one another to substantially eliminate edge buildup along the width of the extruded layers, that otherwise occurs in extruded flat film. The external deckle means comprises an open boat type carrier member that straddles the outlet slots at selected locations along the length thereof, as at the end edges of each slot and holds a deckle block member having offset end portions in sealing relation against the slots, so that different width layers are extruded from each slot. In this manner each extruded layer has less than one-half of the bead dimension that is present on non-deckled films or on uniformly deckled films. The internal deckle means comprises rod-like members associated with the final land surfaces of each outlet slot and extends inwardly different amounts for each outlet slot so that different width layers are extruded from each opening. Internal and external deckle means can be combined on a single die body.

A wide variety of thermo-extrudable materials can be coextruded in accordance with the principles of the invention. Thermoplastic resins of diverse melt indexes and/or melt rheology are readily coextrudable in accordance with the invention and include, for example, acrylonitrile-butadienestyrene copolymers, acetyl homopolymers and copolymers, acrylic polymers, cellulistic polymers, ethyl acylic ester polymers, ethyl vinyl acetate polymers, fluoroplastic polymers, ionomer polymers, methyl pentane polymers, polyamide (nylon) polymers, phenoxy polymers, polyallomer copolymers, polycarbonate polymers, polyethylene polymers, polyester polymers, polyimide polymers, phenylene oxide polymers, polypropylene polymers, polystyrene polymers, polysulfono polymers, polyvinyl chloride polymers, polyvinylene chloride polymers, polyurethane polymers, etc. These resins can include foaming agents, coloring additions, anti-friction additives, etc. Further, certain of the resins may be in expanded form as foamed resins. Other thermo-extrudable materials co-extrudable in accordance with the principles of the invention include, for example, natural and synthetic waxes, paraffins, hot melts, adhesives, coloring agents, etc.

Referring to the embodiment of FIG. 1, a die body 10 is comprised of a first body portion 11 and a second body portion 11a, which are assembleable into a single body formed of two mirror image portions. Such mirror image portions are economically manufactured and reduce the overall cost of the die body 10. Of course, if desired, the die body 10 may be formed of a single monolithic body or comprised of two closely adjacent portions. The body portions 11 and 11a are held rigidly in assembly by bolt means, and an exemplary horizontal bolt 13 and an exemplary vertical bolt may be used.

The centerplate 12 extends downwardly in a machine direction and is positioned between the body portions 11 and 11a and is essentially rectangular in shape for ease in machining. A key-like member locks the plate along its upper portion. Other means of securing the plate to the body portions can also be utilized. The centerplate 12 is preferably composed of a heat-resistant material, preferably material such as stainless steel, aluminum, an alloy, etc. and the side surfaces thereof are smooth and highly polished.

As an alternate to the metallic plate the centerplate 12 may have its main portion formed of insulation such as asbestos board.

Melt inlet passages 16 and 16a respectively are provided in each of the body portions 11 and 11a in a direction transverse to said machine direction. In the embodiment shown in FIG. 1, the inlet passages 16 and 16a are adapted for center feed operation. Extruder conduits or connecting adapters interconnect inlet passages 16 and 16a with at least one extruder providing a thermo-extrudable material and preferably with a plurality of extruders providing a different melt to each inlet passage. The die body of the invention can be connected to the extruders by means of machined rigid connecting adapters or by flexible coupling adapters formed of standard hydraulic stainless steel tubing, such as is capable of withstanding pressures of about 10,000 psi each. While the inlet passages 16 and 16a are illustrated as being vertically orientated, angular or horizontal orientation may be used.

Manifold chambers 18 and 19, respectively, extend in a cross machine direction and are disposed within each of the horizontal body portions 11 and 11a so that the inner boundary of each chamber is defined by a centerplate 12. The manifold chambers 18 and 19 are somewhat streamlined and tapered downwardly toward the centerplate 12. The boundaries of the chambers 18 and 19 extend into the body portions 11 and 11a respectively and are somewhat tear-shaped for improved flow characteristics of melts therein and improved heat distribution. Each of the manifold chambers discharges at the lower or forward end and the melt within the chambers flows toward the centerplate 12.

Pre-land surfaces 20 cooperate with the centerplate 12 to define narrow melt surfaces for coarse throttling or control of each melt stream. Final land surfaces 21 join the pre-land surfaces 20 and in cooperation with the side surfaces of the centerplate 12 define second narrower melt flow passages for fine throttling or control of melt stream. The final land surfaces 21 terminate at the bottom of the die body 10 and in cooperation with the terminal end of the centerplate define at least a pair of side-by-side outlet slots 22. The outlet slots 22 are relatively close to one another so that the extruded melt layers may be readily bonded to one another or to a substrate while still in their molten state. The manifold chambers 18 and 19, the pre-land surfaces 20, the final land surfaces 21 and the outlet surfaces 22 extend substantially along the entire length of the die body and are closed from ambient environment along their ends by a pair of end plates (not shown).

A pair of relatively deep narrow grooves 20 and 21 are provided along the outer walls of the die body portions 11 and 11a. The grooves 15 extend inwardly along each body portion for a given distance at approximately 45° to the centerplate. This configuration of the grooves 15 toward the pre-land surfaces allows the body portions below the grooves to move in respect to the body portions above the grooves. Since the upper and lower body portions are formed from a unitary piece of material, inherent strength and flexibility of such portions must be assured. Certain prior art arrangements include movable lips on a die but are composed of a plurality of separate pieces and thus lack inherent strength and flexibility of a unitary body.

Figure 3:
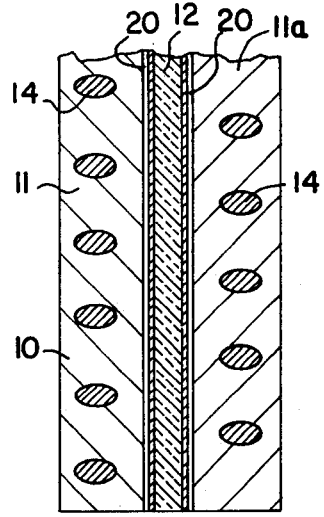
FIG. 3 is a partial sectional view of FIG. 1 on the line 3—3 thereof.

Adjustable thimble bolts 14 are positioned within the body portion above the grooves 15 so that they have their inner ends abuting against the lower groove walls to selectively move the body portions below such grooves toward and away from one another and thereby adjust the width and profile of the outlet slots respectively. As shown in FIG. 3 the thimble bolts 14 are in an opposing alternatingly staggered relation to each other along the length of the die body. This arrangement is contrary to conventional die lip adjustment means and eliminates hills and/or valleys in each of the extruded layers so that a substantially uniform caliber of composite film is produced.

A pair of relatively shallow grooves are provided along the respective outer walls 11 and 11a and positioned below the grooves but above the outlet slots. The grooves extend inwardly substantially perpendicularly to the final land surfaces and accommodate an external deckle bar carrier member 17. While only one deckle bar carrier member is shown, a plurality of similar members can be provided along the length of the die body and in certain preferred embodiments at least a pair of such carrier members are utilized, one at each end of the die body. Since the carrier members are all essentially identical in construction, only one carrier member will be described in detail.

The deckle bar carrier member 17 is generally referred to as a "boat" deckle and is preferably formed from a single piece of relatively strong heat-resistant material, such as metal. The boat deckle or carrier member 17 includes a pair of upwardly extending arms 17a which terminate in inwardly turned ends 17b, respectively to be slidably received in grooves 15a. Means for selectively moving the deckle boat along the length of the die body are provided (not shown) so that the deckle boat may be precisely moved to a desired location and positively locked in place in such location.

The deckle boat 17 is formed with a U-shaped recess 17c having a bottom wall 17d opposite the outlet slots. A deckle bar 24 is shown as a solid body, made of suitable heatresistant metal, however with permissibly packing provided at intervals. The packing may be impregnated with graphite or polytetrafluoroethylene.

Means for providing a regulation of pressure or sealing force on the bar against the outlet slots includes a plurality of set screws 25 which are externally threaded through the bottom wall of deckle boat 17. Other means are provided including biasing members for the packing strips and their support bodies.

As indicated earlier, end plate members are suitably secured, as by bolts, on each end of the die body 10 so as to prevent the melt from escaping the confines of the die body. Means for regulating the heat along each of the melt flow passages throughout the die are operationally attached to the die body and provide an independent temperature for each melt as desired. Suitable heating means include resistant heaters, such as cast-in aluminum heaters that are comprised of, for example, an electrical heating element cast into an aluminum jacket for attachment to desired positions on the die body. Other heating means include a plurality of flow passageways for circulating a heating medium within select portions of the die body. The heating meas allows a select temperature differential to exist between the melt extruded from the various slots, for example 0° to 200° F. or higher. Such heat differential provides improved bonding characteristics between the various thermo-extrudable materials and/or between such materials and various substrates.

In FIG. 1 a heat sink 27 is provided. The heat sink 27 comprises a pair of opposing sink-cavities which are being formed in its respective body portions. The sink-cavities extend substantially the entire length of the die and are positioned slightly above an upper periphery of the manifold chambers 18 and 19 so as to extend upwardly therefrom and terminate some distance below the top of the die body. The actual dimension of such heat sink-cavities varies in accordance with the dimension of the die body and is generally of sufficient dimension to entrap heat from one side of the centerplate member 12 and prevent any substantial portion thereof from being transferred to the other side thereof. The heat sink comprises the greater part of the distance from the top of the die to the manifold on each side.

The internal deckle rods 28 are positioned at the juncture of the pre-lands and the final lands to extend inwardly at preselected distance so as to vary the width of each of the flow passageways available for the respective melts and thereby reduce and/or eliminate edge buildup in the extruded layers. This internal deckle is of course optional and may be used instead of an external deckle. The external deckle here comprises a deckle boat 17.

Edge bead and/or edge buildup is one of the more serious problems encountered in the extrusion of flat films or sheets and generally comprises the non-uniform thickness of the extruded sheet throughout the widths thereof, particularly at the edges. The thickness of the edge bead can be 300 to 500% greater than the caliber or thickness of the sheet at the center portion. This is, of course, highly undesirable and edge beads are trimmed and discarded as waste because generally two or more melt materials are intermixed within such beads. Of course, when such extruded sheets are coated on a substrate, the edge portions of the substrate must also be trimmed and discarded. This is extremely uneconomical. Causes of edge buildup vary with various thermo-extrudable materials, melt temperatures, viscosity or melt indexes, densities, surface tension effects, etc. Since substantial economical advantages would result from the elimination and/or reduction of edge buildup, various attempts to eliminate edge beads have been made, generally without success. The combination of improved heat distribution and regulation within the individual melt streams in the die body and the deckle means provided in accordance with the principles of the invention, substantially eliminates or in certain instances reduces by a factor of about 50% edge beads otherwise present on extruded flat film.

Figure 2:
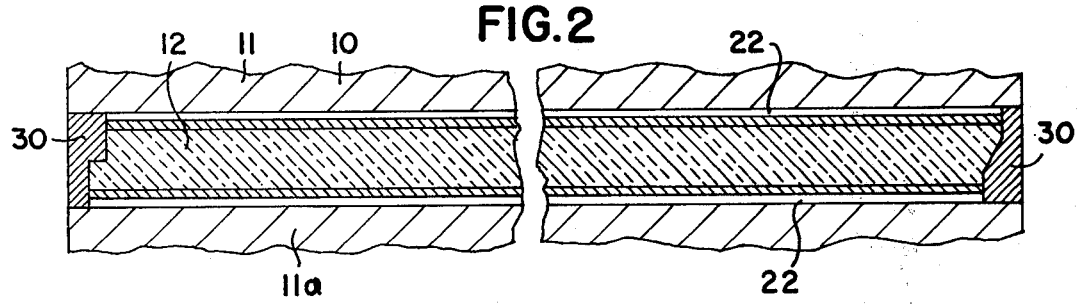
FIG. 2 is a fragmentary section of FIG. 1 along the line 2—2 thereof.

Referring to FIG. 2, this indicates certain specific embodiments of deckle bars 30, shown in working relation with a die body 10 having outlets 22 respectively. On the right hand embodiment, a deckle bar 30 is formed to have a stepped inner side edge or face comprising a first step and a second step and joined to the first step by a gradual or sloping juncture. The steps seal off different lengths of each outlet slot so that the extruded sheets have offset widths or side edges. Such deckle bars substantially eliminate edge beads with most thermo-extrudable materials and in others cause a reduction of edge bead so that when the offset edges of the extruded sheets are bonded together or onto a substrate, the two offset edges cannot combine and the variation in thickness at the edges is very minor and very little, if any, extruder trim is required. In the left handed embodiment, the deckle bar is formed somewhat similar to the deckle bar on the right but has a stepped inner side edge or face comprised of a first step and a second step, joined at the first step by a sharp or straight juncture. Since the steps are offset from each other and are aligned so as to overlap or seal only one of the outlet slots, the edges of the sheets extruded therefrom are likewise offset. Deckle bars are utilizable on opposite ends of the same die body so that the resultant composite film has opposingly staggered side edges, allowing one side to be trimmed of one material and the other side to be trimmed of another material, whereby both materials can be recycled as desired so that no waste results. Of course, an opposing pair of deckle bars may be utilized on a single die body and only the same material be trimmed from both sides of the resulting composite film.

FIG. 2 illustrates a die body 10 composed of body portions 11 and 11a, a centerplate member 12 and a pair of closely adjacent outlet slots 22 wherein thimble bolts 14 are uniformly staggered on opposite sides of the die body for selective movement of each outer wall of each die slot. Thimble bolts 14 allow precise control of each layer of thickness and because of the uniform staggered relation, allow elimination or reduction of hills and valleys in the composite extruded film so that a substantially uniform caliber of film or coating is readily attained along the entire width of the die. The width of each outlet slot is precisely and uniformly adjustable by selective movement of the outer wall thereof so that uniform gauge thickness can be maintained between the film. The gauge thicknesses range normally from about 0.1 to 10 or more mils (0.001 to 0.01 inches).

Figure 4:
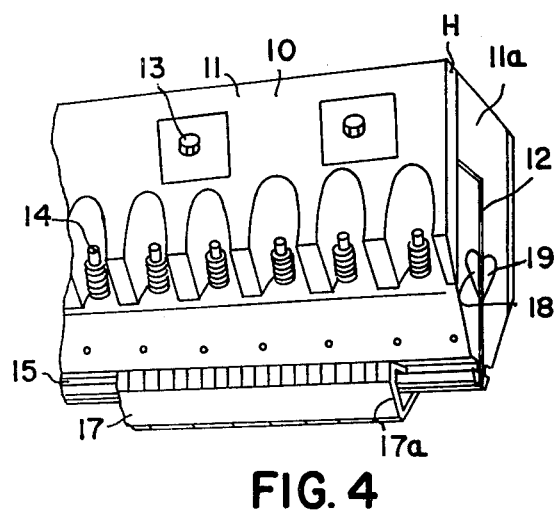
FIG. 4 is a partial perspective view of the apparatus of the invention, omitting certain parts.

FIG. 4 is a partial perspective view of the die body 10 constructed in accordance with the principles of the invention, with an end plate removed for the sake of clarity. The die body 10 is somewhat rectangular in configuration, with convergingly sloping bottom walls that terminate in a pair of closely adjacent outlet slots 22. The deckle boat 17 is mounted for selective movement along grooves 15 situated above the outlet slots.

The deckle boat may be provided with indicia markings along visible surfaces thereof, such as distance indicia so that an operator can readily determine the position of the deckle boat in relation to the die body. The deckle boat 17 includes means for positively moving and securing the same to a given location along the length of the die body. A plurality of heating plates H are secured along the portions of the die body and are appropriately connected to an energy source (not shown), so that the heating plate H can be independently regulated to provide a desired amount of heat to its portion of the die body.

The heating means associated with the die body comprises precise temperature control of each melt throughout the flow passages within the die. Each of the heating means is independently controllable and substantial temperature differential between adjacent melts is readily attained. This is an important feature of the invention since it allows one melt to be heated to a substantially greater temperature while the other melt is maintained at a substantially lower temperature. This feature not only allows completely different thermo-extrudable materials to be coextruded but also, during coating operation, allows the melt to be relatively joined to a substrate to be heated to a higher temperature whereby improved bonding is achieved while at the same time minimizing deteriorations and/or odor from the other melt, maintained at a lower temperature.

The deckle means, whether the external deckle means or internal deckle means or a combination thereof, are so positioned onto outlet slots that offset end edges result in the extruded sheets, thereby greatly reducing and/or eliminating edge buildup. The amount of offset required between the adjacent end edges of the outlet slots to avoid edge buildup depends upon a relatively large number of complex factors, which may be summarized by stating that the amount of offset depends upon the amount of neck-in occurring for a given thermo-extrudable material at given operating conditions before such material solidifies or reaches a support, such as a substrate. For example, when the thermo-extrudable material forming both melts is polyethylene, the end edges of the outlet slots are deckled so that they can be offset from each other about 0.125 to about 0.375 inch (⅛ to ⅜ inch) and preferably 0.25 inch. Other thermo-extrudable materials require different offset end edges to avoid edge buildup, and the exact amount thereof is readily determined by simple observation during operation. The deckle means of the invention is easily adjustable to provide various amounts of edge offset during operation of the die so that an operator can readily adjust the same as required to substantially eliminate edge buildup during coextrusion of any combination of thermo-extrudable materials.

Figure 5:
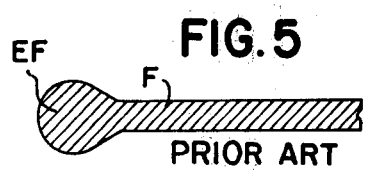
FIG. 5 is a conventional section of the film at the edge, in the prior art.

FIG. 5 shows one side of a solidified film F having an edge bead EF formed by prior art dies. As can be seen, the edge bead EF is substantially thicker than the other film portion and must be trimmed at the extruder so that a uniform caliber of film can be obtained for further processing.

Figure 6:
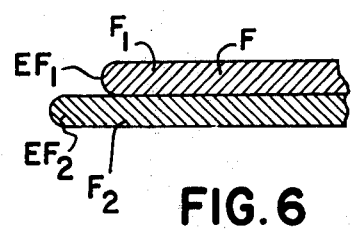
FIG. 6 is a conventional section of the film at the edge in the invention.

FIG. 6 illustrates one side of a composite multilayer film F formed in accordance with the invention and comprising a film $F_1$ and a film $F_2$, each formed of melt streams $M_1$ and $M_2$ respectively. It will be noted that the end edges $EF_1$ and $EF_2$ of each respective film have almost no visible bead so that extruder trimming is substantially eliminated.

As will be appreciated, there are two types of trim in producing commercial flat films. First, there is a trim at or on the extruder itself to eliminate edge beads and associated irregularities. With an average 60 inch film width, the extruder trim is approximately one inch on each side or about 3.3% trim. With coextrusion dies producing a multilayered film having each layer composed of a different thermo-extrudable material, this trim is pure waste and cannot be recycled. However, with a die assembly constructed in accordance with the principles of the invention, this waste is substantially eliminated and corresponding economic advantages are realized. The second trim occurs downstream of the extruder and comprises approximately a one half trim on each side of the film.

Modifications, variations and changes from described preferred exemplary embodiments may be made without departing from the spirit and scope of the novel concepts of the invention.

I claim:

1. A die assembly for the extrusion of multiple flat films of thermo-extrudable materials for ultimate creation of materials including more than one such film, comprising:
   a. a die body having at least two separate melt inlets;
   b. at least two manifold chambers positioned within said die body and each in communication with one of said melt inlets;
   c. a center plate separating said manifold chambers from each other throughout their extent;
   d. at least two separate elongated relatively narrow first melt flow passages each in communication with a different manifold chamber for relatively coarse melt flow control;
   e. at least two separate elongated relatively narrow second melt flow passages each in communication with a different first melt flow passage for relatively fine melt flow control;
   f. at least two separate melt outlet slots having a relatively narrow width dimension and each communicating with a different one of said second melt flow passages, each being defined by a substantially immovable inner wall and a relatively movable outer wall;
   g. means associated with each of said outlet slots for selectively varying the width dimensions of each said slot;
   h. the melt flow passages and melt outlet slots from them being directed so as to produce extrusion of films in a general direction which herein will be defined as the downward direction of the die and the opposite direction being defined as the upward direction of the die, with the films themselves having in cross section a longer dimension in a particular direction which herein will be defined as lengthwise of the die and the dimension of the die in that direction as the length of the die and a shorter dimension which herein will be defined as crosswise of the die, the center plate being central of the die in the crosswise direction and separating the die into two parts from the standpoint of that crosswise direction, with one manifold chamber and first and second melt flow channel on one side of that center plate and the other manifold chamber and first and second melt flow channel on the other side of the center plate;
   i. heat sink slots in the upper part of the die on either side of the center plate and against the center plate, extending from slightly above the upper periphery of the manifold chambers up more than half the distance to but substantially below the top of the die.

2. A die assembly of claim 1, in which the die parts have their deckles offset from one another.

* * * * *